(12) United States Patent
Chino et al.

(10) Patent No.: US 6,403,720 B1
(45) Date of Patent: Jun. 11, 2002

(54) RUBBER COMPOSITION AND PRODUCTION PROCESS THEREOF

(75) Inventors: Keisuke Chino; Hidekazu Onoi; Satoshi Mihara, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/642,635

(22) Filed: Aug. 22, 2000

(30) Foreign Application Priority Data

Aug. 31, 1999 (JP) ............................................ 11-246190
Feb. 23, 2000 (JP) ............................................ 12-052156

(51) Int. Cl.<sup>7</sup> ............................. C08L 7/00; C08L 9/00; C08L 23/00; C08L 23/04
(52) U.S. Cl. ....................... 525/191; 525/213; 525/219; 525/232; 525/233; 525/238; 525/240; 525/241
(58) Field of Search ................................. 525/191, 213, 525/219, 232, 233, 238, 240, 241

(56) References Cited

U.S. PATENT DOCUMENTS

| 4,146,592 | A | * | 3/1979 | Kitagawa et al. | ............ 525/213 |
| 5,395,891 | A | * | 3/1995 | Obrecht et al. | ............. 525/194 |
| 6,184,296 | B1 | * | 2/2001 | Obrecht et al. | ............. 525/232 |
| 6,242,534 | B1 | * | 6/2001 | Obrecht et al. | ............. 525/191 |

FOREIGN PATENT DOCUMENTS

JP          10204217 A          8/1998

\* cited by examiner

*Primary Examiner*—Nathan M. Nutter
(74) *Attorney, Agent, or Firm*—Arent, Fox, Kintner, Plotkin & Kahn

(57) ABSTRACT

A rubber composition containing 50 to 90 parts by weight of a diene rubber and 50 to 10 parts by weight of a gelled rubber having a toluene swelling index of 16 to 150, based upon the total amount of 100 parts by weight of the diene rubber and the gelled rubber.

4 Claims, No Drawings

RUBBER COMPOSITION AND PRODUCTION PROCESS THEREOF

BACKGROUND OF THE INVENTION

1. Field of the Invention

The present invention relates to a rubber composition suitable for use as, for example, a tire, which is obtained by blending a gelled rubber synthesized with an acid anhydride etc., without substantially decreasing abrasion resistance, with the improved wet performance, and with the decreased rolling resistance, and a process for producing the same.

2. Description of the Related Art

In rubber compositions used for automobile tires etc., rubber compositions superior in drivability on wet road and low in rolling resistance are desired. From such a viewpoint, for example, Japanese Unexamined Patent Publication (Kokai) No. 10-204217 proposes to blend an SBR rubber gel to a rubber composition. This SBR rubber gel is synthesized by a method of cross-linking the SBR rubber with a polyfunctional compound such as divinylbenzene during the polymerization or a method of cross-linking of the polymer after polymerization with a peroxide etc.

SUMMARY OF INVENTION

It is known that, when carbon is blended into rubber the tan δ curve with respect to the temperature becomes broad and the viscoelastic properties are deteriorated. The present inventors engaged in research to develop a rubber composition having a superior wet performance, that is, having a high grip on wet road surfaces and having a low rolling resistance, by mixing a rubber having a low glass transition temperature Tg with a gelled rubber having a high glass transition temperature Tg so as to suppress the incorporation of carbon black to high Tg rubber and hopefully to obtain a rubber composition with the balanced values of tan δ at 0° C. and tan δ at 60° C. As a result, we found that, by mixing a gelled rubber obtained by gelation with a cross-linking agent in the diene rubber, the viscoelastic properties of the rubber composition can be improved. Further, we found that a rubber composition prepared by a two-stage mixing method of premixing the carbon black and other compounding agents to a low Tg rubber, and then mixing the resultant mixture with the gelled rubber obtained by gelation of a high Tg rubber further provides the improved viscoelastic properties.

Accordingly, the objects of the present invention is to provide a rubber composition having a superior tan δ balance, without substantially decreasing the abrasion resistance and with the improved wet performance and decreased rolling resistance and a process for producing the same.

In accordance with the present invention, there is provided a rubber composition comprising 50 to 90 parts by weight of a diene rubber and 50 to 10 parts by weight of a gelled rubber having a toluene swelling index of 16 to 150, based upon the total amount of 100 parts by weight of the diene rubber and the gelled rubber.

In accordance with the present invention, there is also provided a process for producing a rubber composition comprising 100 parts by weight of a starting rubber containing 50 to 90 parts by weight of a diene rubber and 50 to 10 parts by weight of a gelled rubber, the glass transition temperature of the diene rubber being at least 10° C. less than the transition temperature of the gelled rubber, and 30 to 120 parts by weight of a filler, comprising the steps of mixing the diene rubber and at least 80% by weight of the total amount of the filler at a temperature of at least 135° C., and then mixing the gelled rubber and the remaining filler with the resultant mixture.

DESCRIPTION OF THE PREFERRED EMBODIMENT

In a tire use rubber composition comprised of a low Tg (i.e. glass transition temperature) polymer and high Tg polymer, the tan δ around 0° C. is affected to a large extent by the compatibility of the two polymers. The tan δ around 0° C. is improved if the two polymers are incompatible. Further, by blending carbon black to the rubber, the tan δ curve is broadened. Therefore, when the carbon black is predominated in the low Tg polymer and then the high Tg polymer is blended thereto, the incorporation of the carbon black into the high Tg polymer side is suppressed and the tan δ around 60° C. is decreased.

In the present invention, a gelled rubber having a toluene swelling index of 16 to 150 is blended, as the high Tg polymer, to a low Tg polymer of a diene rubber the incompatibility of the two polymers is promoted, the tan δ around 0° C. is improved, and the abrasion resistance is not too much impaired or, in some cases, is even improved. Further, according to the present invention, when the filler such as the carbon black is predominated in the low Tg polymer and when the gelled rubber is added thereto, the tan δ around 0° C. is improved and the tan δ around 60° C. is decreased and the abrasion resistance is maintained.

The gelled rubber used in the present invention may be produced by, for example, reacting a diene rubber such as a styrene-butadiene copolymer rubber (SBR) with maleic anhydride and a phenol compound having an aromatic hydroxyl group (e.g., phenol, t-butylphenol, catechol and t-butyl catechol, hydroquinone, and resorcinol etc.) or a peroxide compound (e.g., dicumyl peroxide etc.) or a mercapto compound (e.g., trithiocyanic acid, 1,10-decanethiol, etc.) at a temperature of 80 to 250° C.

Examples of the above phenol compounds are as follows.

Monophenol Compounds
  2,6-di-t-butyl-p-cresol butylated hydroxyanisole (BHA)
  2,6-di-t-butyl-4-ethylphenol
  Stearyl-β-(3,5-di-t-butyl-4-hydroxyphenyl) propionate Bisphenol Compounds
  2,2'-methylenebis(4-methyl-6-t-butylphenol)
  2,2'-methylenebis(4-ethyl-6-t-butylphenol)
  4,4'-thiobis(3-methyl-6-t-butylphenol)
  4,4'-butylidenebis(3-methyl-6-t-butylphenol)
  3,9-bis[1,1-dimethyl-2-[β-(3-t-butyl-4-hydroxy-5-methylphenyl)propionyloxy]ethyl]2,4,8,10-tetraoxapyro[5,5]undecane Phenol Polymer Compounds
  1,1,3-tris(2-methyl-4-hydroxy-5-t-butylphenyl)butane
  1,3,5-trimethyl-2,4,6-tris (3,5-di-t-butyl-4-hydroxybenzyl)benzene
  Tetrakis-[methylene-3-(3',5'-di-t-butyl-4-hydroxyphenyl)propionate]methane
  Bis[3,3'-bis(4'-hydroxy-3'-t-butylphenyl)butyric acid] glycol ester
  1,3,5-tris(3', 5'-di-t-butyl-4'-hydroxybenzyl)-S-triazine-2,4,6-(1H,3H,5H)trione
  Tocopherol(S)

Other Phenol Compounds
  2,6-di-tert-butyl-4-methylphenol (BHT)
  Mono(or di-or tri-)(α-methylbenzyl)phenol
  2,2'-methylenebis(4-methyl-6-tert-butylphenol)

2,2'-methylenebis(4-ethyl-6-tert-butylphenol)
4,4'-butylidenebis(6-tert-butyl-3-methylphenol)
4,4'-thiobis(6-tert-butyl-3-methylphenol)
1,1-bis(4-hydroxyphenyl)-cyclohexane
2,5-di-tert-butylhydroquinone
2,5-di-tert-amylhydroquinone comprises the phenol compound abstraction of the hydrogen from the benzyl position or allyl position, adding the benzyl radicals or allyl radicals thus formed to the acid anhydride, and adding the radicals to the double bonds of other rubber molecules or radical coupling them with other rubber molecules to form cross-linking.

The gelled rubber according to the present invention has to have a toluene swelling index of 16 to 150, preferably 16 to 100. The "toluene swelling index" in the present invention is determined by immersing 0.1 g of a gelled rubber in 100 ml of toluene at room temperature for 24 hours, weighing the weight of the rubber at that time (wet weight), then drying the rubber in vacuo at room temperature for 24 hours, measuring the dry weight, and finding the swelling index from the wet weight/dry weight. If the toluene swelling index is too small, the abrasion resistance deteriorates, whereas if it is conversely too large, there is no great difference with normally ungelled rubber and no improvement effects in the viscoelastic properties are observed. Further, a gelled rubber containing at least 0.1% by weight, preferably 0.5 to 10% by weight, of an acid anhydride moiety in the molecule, has less deterioration of the abrasion resistance and in some cases is further improved compared with an ordinary rubber. Further, a rubber composition obtained by mixing the gelled rubber produced with a peroxide compound or mercapto compound to a diene rubber may be affected in vulcanized physical properties with the peroxide compound or mercapto compound, and therefore, a gelled rubber produced from an acid anhydride and phenol compound is more preferable.

The rubber composition according to the present invention is obtained by blending 50 to 90 parts by weight, preferably 60 to 85 parts by weight, of the diene rubber and 50 to 10 parts by weight, preferably 40 to 15 parts by weight, of at least one gelled rubber, (Note: the total amount of 100 parts by weight). If the amount Examples of the other cross-linking agents are organic peroxides such as dicumyl peroxide, t-butylcumyl peroxide, bis-(t-butyl-peroxy-isopropyl)benzene, di-t-butyl peroxide, 2,5-dimethylhexane-2,5-dihydroperoxide, 2,5-dimethyl-3-hexine-2,5-dihydroperoxide, benzoyl peroxide, 2,4-dichlorobenzoyl peroxide, t-butyl perbenzoate; organic azo compounds such as azobisisobutyronitrile and azobiscyclohexanenitrile; dimercapto compounds and polymercapto compounds such as dimercaptoethane, 1,6-dimercaptohexane, and 1,3,5-trimercaptotriazine, trimethylol propane tris(β-thiopropionate), 1,8-dimercapto-3,6-dioxaoctane, mercapto-terminated polysulfide rubbers such as mercapto-terminated reaction products of bis-chloroethylformal and sodium polysulfide, sulfur chloride, dimercapto acids, quinones (e.g., p-quinone), quinonedioximes (e.g., p-quinonedioxime, p-quinoneoxime benzoate), polyhalides (trichloromelamine, hexachlorocyclopentadiene, octachlorocyclopentadiene, trichloromethanesulfochloride, benzotrichloride, paraffin chloride, PVC, chloroprene rubber, chlorosulfonated polyethylene, etc.), and metal oxides (stannous chloride, lead oxide, etc.), or triethanolamine, paraformaldehyde or polyoxymethylene and protonic acid or Lewis acid (stannic (II) chloride, paratoluene sulfonic acid, etc.), boranes (for example, triethylamine-chloroborane, triethylene diamine-bischloroborane); dinitrones (phenylhydroxylamine or terephthalaldehyde), dinitrile oxides (terephthalonitrile oxide, terephthalohydroxamyl chloride), dinitrile imines (terephthalylphenylhydrazide chloride and triethylamine), disydnones (p-phenylene-3,3'-disydnones), thionyl paraphenylene diamine, etc.

In the present invention, at least 0.1% by weight, preferably 0.5 to 30% by weight, of the maleic anhydride and at least 0.05% by weight, preferably 0.1 to 5% by weight, of a phenol compound such as tert-butyl catechol are reacted with the rubber. The reaction mechanism of the gelled rubber blended is too small, the expected effect is hard to appear, while if conversely too large, the abrasion resistance is deteriorated.

The diene rubber used in the rubber composition of the present invention is not particularly limited, but any diene rubber generally used in various types of rubber compositions in the past, such as natural rubber (NR), polyisoprene rubber (IR), styrene-butadiene copolymer rubber (SBR), polybutadiene rubber (BR), acrylonitrile butadiene copolymer rubber (NBR), butyl rubber (IIR), chloroprene rubber, ethylene-propylene copolymer rubber, ethylene-propylene diene copolymer rubber, etc. may be mentioned. These rubbers may be used alone or in any blend thereof.

The rubber composition according to the present invention is preferably produced as follows.

That is, according to the present invention, 30 to 120 parts by weight, preferably 40 to 100 parts by weight, of a filler such as carbon black or silica is blended to 100 parts by weight of a starting rubber comprised of 50 to 90 parts by weight, preferably 60 to 85 parts by weight, of a diene rubber and 50 to 10 parts by weight, preferably 40 to 15 parts by weight, of a gelled rubber. At that time, a diene rubber having a glass transition temperature Tg of at least 10° C. lower than the Tg of the gelled rubber is preferable. More preferably, the diene rubber and at least 80% by weight of the total weight of the filler are mixed at a temperature of at least 135° C., and then the gelled rubber and the remaining filler are mixed to produce the desired rubber composition.

The rubber composition may contain thereof compounding agents normally used in the rubber industry if necessary. As such compounding agents, in addition to a filler such as the above carbon black and silica, for example a vulcanization accelerator, vulcanization promoter, antioxidant, plasticizer, softener, etc. may be mentioned. These may be blended in their respectively necessary amounts.

The rubber composition according to the present invention may be used for various types of rubber products such as tires, hoses, conveyor belts, rubber sheets, and fenders, but is particularly preferably used as a rubber composition for a tire.

EXAMPLES

The present invention will now be further illustrated by, but is by no means limited to, the following Examples.

Standard Example 1, Examples 1 to 2, and
Comparative Example 1

Synthesis of Gelled Rubber (1) SBR1-gel 1: Gelled rubber SBR1-gel 1 was produced by adding, to 500 g of styrene-butadiene copolymer rubber (SBR) (glass transition temperature: −24.5° C.) (NS110 manufactured by Nippon Zeon), 5 g of maleic anhydride and 0.5 g of tert-butyl catechol, followed by mixing in a kneader at 150° C. for about 60 minutes. When 0.2 g of the rubber thus obtained was immersed in 100 ml of toluene for 24 hours, the rubber was swelled, without dissolving, and therefore the gelation was confirmed. The swelling index was calculated by the wet weight/dry weight. Further, from IR analysis, absorption at 1780 $cm^{-1}$ was confirmed, whereby the incorporation of an acid anhydride structure to the rubber was confirmed.

The SBR1-gel 1 thus obtained had an acid anhydride content of 0.8% by weight and a swelling index of 18.

(2) SBR1-PO gel: 250 g of SBR (NS110 manufactured by Nippon Zeon) was dissolved in 1 liter of cyclohexane. 20 g of dicumyl peroxide was added thereto. The mixture was stirred in an autoclave under nitrogen at 60° C. for 2 hours, then the temperature was raised and the mixture stirred at 150° C. for 45 minutes. Next, 100 g of a 10% aqueous sulfuric acid solution was added to coagulate the gelled rubber and the resultant product was dried in vacuo at 60° C. over 2 days. The swelling index was 13.

(3) SBR2-gel 1: Produced from styrene-butadiene rubber (NS110, Nippon Zeon) in a similar method to the production of SBR1-gel 1 except for mixing at 150° C. for 30 minutes. The swelling index was 18.

The gelled rubber synthesized above and the starting rubber SBR1 (NS110 manufactured by Nippon Zeon, Tg =-24.5° C.) were used to obtain, by mixing, the rubber compositions of Standard Example 1, Comparative Example 1, and Examples 1 to 2 by a Banbury mixer and a roll mill, based upon the formulations (parts by weight) shown in Table I and ordinary methods. The rubber compositions thus obtained were press vulcanized at 160° C. for 20 minutes to prepare the desired test pieces which were then evaluated for physical properties.

The ingredients of the formulations used were as follows:

NR (natural rubber): glass transition temperature of –56° C.

Carbon black: Seast 3H (Tokai Carbon)

Zinc white: Zinc White No. 3 (Seido Chemical)

Stearic acid: Lunac YA (Kao Soap)

Antioxidant 6C: Noclac 6C (Ouchi Shinko Chemical)

Sulfur: Oil extended sulfur (Karuizawa Refinery)

Accelerator: Vulcanization accelerator Noccelar CZ (Ouchi Shinko Chemical)

The physical properties were evaluated and tested by the following methods. The results are shown in Table I.

tan δ (0° C., and 60° C.): A spectrometer (manufactured by Toyo Seiki Seisakusho) was used for measurement at an amplitude of ±2%, a vibration of 20 Hz, and an initial strain of 10%. The larger the value of the tan δ (0° C.), the higher the grip on wet road surfaces exhibited, while the smaller the value of the tan δ (60° C.), the smaller the rolling resistance exhibited.

Abrasion resistance: A Lambourn abrasion tester manufactured by Iwamoto Seisakusho was used for measurement according to JIS K6264 and the value shown indexed to the value of Comparative Example 1 as 100. The larger the value, the better the abrasion resistance.

TABLE I

| | Standard Ex. 1 | Comp. Ex. 1 | Ex. 1 | Ex. 2 |
|---|---|---|---|---|
| NR | 70 | 70 | 70 | 70 |
| SBR1502 | 30 | — | — | — |
| SBR1-PO gel | — | 30 | — | — |
| SBR1-gel 1 | — | — | 30 | — |
| SBR2-gel 1 | — | — | — | 30 |
| Carbon black | 50 | 50 | 50 | 50 |
| Zinc white | 3 | 3 | 3 | 3 |
| Stearic acid | 1 | 1 | 1 | 1 |
| Antioxidant 6C | 1 | 1 | 1 | 1 |
| Sulfur | 1.75 | 1.75 | 1.75 | 1.75 |
| Vulcanization accelerator | 1 | 1 | 1 | 1 |
| tan δ (0° C.) | 0.282 | 0.301 | 0.305 | 0.314 |

TABLE I-continued

| | Standard Ex. 1 | Comp. Ex. 1 | Ex. 1 | Ex. 2 |
|---|---|---|---|---|
| tan δ (60° C.) | 0.176 | 0.188 | 0.165 | 0.158 |
| tan δ balance | 1.602 | 1.601 | 1.848 | 1.987 |
| Abrasion resistance (index) | 100 | 84 | 94 | 97 |

Standard Example 2, Examples 3 to 5, and Comparative Examples 2 to 3

Rubber compositions having the formulations (parts by weight) shown in Table II were obtained by similar methods to Example 1 and Comparative Examples 1 to 2, except for using the following SBR3 and 4 as the diene rubber and the following rubbers as the gelled rubber and evaluated the physical properties thereof. The results are shown in Table II.

SBR3: Styrene-butadiene rubber (Asahi Chemical, Tufden 1000R, Tg: –72° C.)

SBR4: Styrene-butadiene rubber (Nippon Zeon, Nipol 9529, Tg: –21° C.) SBR4-PO gel 1: Prepared by an analogous method to SBR1-PO gel by dissolving 250 g of styrene-butadiene rubber (Nippon Zeon, Nipol 9550) in 1 liter of cyclohexane and adding 37.5 g of dicumyl peroxide. The swelling index was 13.

SBR4-gel 1: A gelled rubber prepared from styrene-butadiene rubber (Nippon Zeon, Nipol 9550) in an analogous method to SBR1-gel 1. The swelling index was 14.

SBR4-PO gel 2: Prepared by an analogous method to SBR1-PO gel by dissolving 250 g of styrene-butadiene rubber (Nippon Zeon, Nipol 9550) in 1 liter of cyclohexane and adding 20 g of dicumyl peroxide. The swelling index was 18.

SBR4-gel 2: A gelled rubber prepared from styrene-butadiene rubber (Nippon Zeon, Nipol 9550) in an analogous method to SBR2-gel. The swelling index was 25.

SBR5-gel: Styrene-butadiene rubber gel (Nippon Zeon, 2001). The swelling index was 72.

TABLE II

| | Standard Ex. 2 | Comp. Ex. 2 | Comp. Ex. 3 | Ex. 3 | Ex. 4 | Ex. 5 |
|---|---|---|---|---|---|---|
| SBR3 | 70 | 70 | 70 | 70 | 70 | 70 |
| SBR4 | 30 | — | — | — | — | — |
| SBR4-PO gel 1 | — | 30 | — | — | — | — |
| SBR4-gel 1 | — | — | 30 | — | — | — |
| SBR4-PO gel 2 | — | — | — | 30 | — | — |
| SBR4-gel 2 | — | — | — | — | 30 | — |
| SBR5-gel | — | — | — | — | — | 30 |
| Carbon black | 70 | 70 | 70 | 70 | 70 | 70 |
| Zinc white | 3 | 3 | 3 | 3 | 3 | 3 |
| Stearic acid | 1 | 1 | 1 | 1 | 1 | 1 |
| Antioxidant 6C | 1 | 1 | 1 | 1 | 1 | 1 |
| Aromatic oil | 15 | 15 | 15 | 0 | 15 | 15 |
| Sulfur | 1.75 | 1.75 | 1.75 | 1.75 | 1.75 | 1.75 |
| Accelerator | 1 | 1 | 1 | 1 | 1 | 1 |
| tan δ (0° C.) | 0.450 | 0.457 | 0.454 | 0.509 | 0.513 | 0.517 |
| tan δ (60° C.) | 0.272 | 0.332 | 0.325 | 0.265 | 0.260 | 0.277 |
| tan δ balance | 1.658 | 1.377 | 1.397 | 1.921 | 1.975 | 1.866 |

TABLE II-continued

|  | Standard Ex. 2 | Comp. Ex. 2 | Comp. Ex. 3 | Ex. 3 | Ex. 4 | Ex. 5 |
|---|---|---|---|---|---|---|
| Abrasion resistance (index) | 100 | 82 | 84 | 93 | 98 | 95 |

Standard Examples 3 to 5, Examples 6 to 7, and Comparative Examples 4 to 5

Rubber compositions having the formulations (parts by weight) shown in Table III were obtained by blending in two steps, i.e., the first step and the second step, by analogous methods to Example 1 and Comparative Examples 1 to 2 using the rubber components shown in Table V and the physical properties were evaluated. Note that the blending of the first step consisted of mixing and kneading by analogous methods to Example 1 and Comparative Examples 1 and 2, while the blending of the second step consisted of mixing and kneading the compounding agents other than the vulcanization system by a Banbury mixer, discharging the resultant mixture, then adding the vulcanization compounding agents and mixing and kneading the same. The results are shown in Table SBR3 and SBR4: As explained above.

SBR5: Styrene-butadiene rubber (Japan Elastomer, Asaprene 303, Tg: –33° C.)

SBR4-gel 1 and SBR4-gel 2: As explained above.

SBR5-gel 1: A gelled rubber prepared from styrene-butadiene rubber (Japan Elastomer, Asaprene 303) in an analogous method to SBR1-gel 1. The swelling index was 10.

SBR5-gel 2: A gelled rubber prepared from styrene-butadiene rubber (Japan Elastomer, Asaprene 303) in an analogous method to SBR2-gel. The swelling index was 17.

Standard Example 7 and Examples 8 to 13

Rubber compositions were obtained by blending by analogous methods to Example 1, except for using the formulations (parts by weight) shown in Table IV and evaluated the physical properties. The results are shown in Table IV.

SBR3 and SBR4: As explained above.

SBR4-gel 3: A gelled rubber prepared by adding to 400 g of styrene-butadiene rubber (Nippon zeon, Nipol 9529, Tg: –21° C.) 10 g of 1,10-decanethiol and mixing the resultant mixture by a kneader at 185° C. for 40 minutes. The swelling index was 21.

RBR4-gel 4: A gelled rubber prepared by adding to 400 g of styrene-butadiene rubber (Nippon Zeon, Nipol 9529, Tg: —21° C.) 9 g of trithiocyanulic acid and mixing the resultant mixture by a kneader at 190° C. for 15 minutes. The swelling index was 32.

SBR4-gel 5: A gelled rubber prepared by adding to 400 g of styrene-butadiene rubber (Nippon Zeon, Nipol 9529, Tg: –21° C.) 7 g of dicumyl peroxide and mixing the resultant mixture by a kneader at 175° C. for 5 minutes. The swelling index was 16.

SBR4-gel 6: A gelled rubber prepared by adding to 400 g of styrene-butadiene rubber (Nippon Zeon, Nipol 9529, Tg: –21° C.) 7 g of benzoquinone and mixing the resultant mixture by a kneader at 180° C. for 20 minutes. The swelling index was 18.

SBR4-gel 7: A gelled rubber prepared by adding to 400 g of styrene-butadiene rubber (Nippon Zeon, Nipol 9529, Tg: –21° C.) 11 g of phenol and 10 g of maleic anhydride and mixing the resultant mixture by a kneader at 180° C. for 30 minutes. The swelling index was 17.

SBR4-gel 8: A gelled rubber prepared by adding to 400 g of styrene-butadiene rubber (Nippon Zeon, Nipol 9529, Tg: –21° C.) 11 g of hydroquinone and 10 g of maleic anhydride and mixing the resultant mixture by a kneader at 180° C. for 40 minutes. The swelling index was 29.

TABLE III

|  | Standard Ex. 3 | Standard Ex. 4 | Comp. Ex. 4 | Ex. 6 | Standard Ex. 5 | Standard Ex. 6 | Comp. Ex. 5 | Ex. 7 |
|---|---|---|---|---|---|---|---|---|
| 1st step |  |  |  |  |  |  |  |  |
| SBR3 | 70 | 70 | 70 | 70 | 70 | 70 | 70 | 70 |
| SBR4 | 45 | — | — | — | — | — | — | — |
| SBR5 | — | — | — | — | 30 | — | — | — |
| Carbon black | 70 | 70 | 70 | 70 | 70 | 70 | 70 | 70 |
| Zinc white | 3 | 3 | 3 | 3 | 3 | 3 | 3 | 3 |
| Stearic acid | 1 | 1 | 1 | 1 | 1 | 1 | 1 | 1 |
| Antioxidant 6C | 1 | 1 | 1 | 1 | 1 | 1 | 1 | 1 |
| Aromatic oil | 0 | 0 | 15 | 15 | 15 | 15 | 15 | 15 |
| NP | 160 | 160 | 160 | 160 | 160 | 160 | 160 | 160 |
| 2nd step |  |  |  |  |  |  |  |  |
| SBR4 | — | 45 | — | — | — | — | — | — |
| SBR4-Gel 1 | — | — | 30 | — | — | — | — | — |
| SBR4-Gel 2 | — | — | — | 30 | — | — | — | — |
| SBR5 | — | — | — | — | — | 30 | — | — |
| SBR5-Gel 1 | — | — | — | — | — | — | 30 | — |
| SBR5-Gel 2 | — | — | — | — | — | — | — | 30 |
| Sulfur | 1.75 | 1.75 | 1.75 | 1.75 | 1.75 | 1.75 | 1.75 | 1.75 |
| Accelerator | 1 | 1 | 1 | 1 | 1 | 1 | 1 | 1 |
| tanδ (0° C.) | 0.450 | 0.415 | 0.460 | 0.475 | 0.446 | 0.415 | 0.450 | 0.468 |
| tanδ (60° C.) | 0.272 | 0.219 | 0.295 | 0.221 | 0.319 | 0.252 | 0.328 | 0.239 |
| tanδ balance | 1.654 | 1.895 | 1.559 | 2.149 | 1.398 | 1.647 | 1.372 | 1.958 |
| Abrasion resistance (index) | 100 | 102 | 82 | 97 | 100 | 136 | 86 | 125 |

TABLE IV

|  | Standard Ex. 7 | Ex. 8 | Ex. 9 | Ex. 10 | Ex. 11 | Ex. 12 | Ex. 13 |
|---|---|---|---|---|---|---|---|
| 1st step | | | | | | | |
| SBR3 | 70 | 70 | 70 | 70 | 70 | 70 | 70 |
| SBR4 | 45 | — | — | — | — | — | — |
| SBR4-gel 3 | — | 30 | — | — | — | — | — |
| SBR4-gel 4 | — | — | 30 | — | — | — | — |
| SBR4-gel 5 | — | — | — | 30 | — | — | — |
| SBR4-gel 6 | — | — | — | — | 30 | — | — |
| SBR4-gel 7 | — | — | — | — | — | 30 | — |
| SBR4-gel 8 | — | — | — | — | — | — | 30 |
| Carbon black | 70 | 70 | 70 | 70 | 70 | 70 | 70 |
| Zinc white | 3 | 3 | 3 | 3 | 3 | 3 | 3 |
| Stearic acid | 1 | 1 | 1 | 1 | 1 | 1 | 1 |
| Antioxidant 6C | 1 | 1 | 1 | 1 | 1 | 1 | 1 |
| Aromatic oil | — | 15 | 15 | 15 | 15 | 15 | 15 |
| Sulfur | 1.75 | 1.75 | 1.75 | 1.75 | 1.75 | 1.75 | 1.75 |
| Vulcanization accelerator | 1 | 1 | 1 | 1 | 1 | 1 | 1 |
| tanδ (0° C.) | 0.466 | 0.452 | 0.455 | 0.515 | 0.505 | 0.533 | 0.535 |
| tanδ (60° C.) | 0.296 | 0.268 | 0.279 | 0.291 | 0.271 | 0.272 | 0.287 |
| tanδ balance | 1.574 | 1.687 | 1.631 | 1.770 | 1.863 | 1.960 | 1.864 |
| Abrasion resistance (index) | 100 | 98 | 95 | 87 | 86 | 87 | 86 |

Standard Examples 8 to 9 and Examples 14 to 19

Rubber compositions were obtained by blending the ingredients in two steps, the first step and second step, by analogous methods to Examples 6 to 7, except for using the formulations (parts by weight) shown in Table V and evaluated the physical properties. The results are shown in Table V.

SBR3 to SBR5: As explained above.
SBR4-gel 3 to SBR4-gel 8: As explained above.

TABLE V

|  | Standard Ex. 8 | Standard Ex. 9 | Ex. 14 | Ex. 15 | Ex. 16 | Ex. 17 | Ex. 18 | Ex. 19 |
|---|---|---|---|---|---|---|---|---|
| 1st step | | | | | | | | |
| SBR3 | 70 | 70 | 70 | 70 | 70 | 70 | 70 | 70 |
| SBR4 | 45 | — | — | — | — | — | — | — |
| SBR5 | — | — | — | — | — | — | — | — |
| Carbon black | 70 | 70 | 70 | 70 | 70 | 70 | 70 | 70 |
| Zinc white | 3 | 3 | 3 | 3 | 3 | 3 | 3 | 3 |
| Stearic acid | 1 | 1 | 1 | 1 | 1 | 1 | 1 | 1 |
| Antioxidant 6C | 1 | 1 | 1 | 1 | 1 | 1 | 1 | 1 |
| Aromatic oil | 0 | 0 | 15 | 15 | 15 | 15 | 15 | 15 |
| NP | 160 | 160 | 160 | 160 | 160 | 160 | 160 | 160 |
| 2nd step | | | | | | | | |
| SBR4 | — | 45 | — | — | — | — | — | — |
| SBR4-Gel 3 | — | — | 30 | — | — | — | — | — |
| SBR4-Gel 4 | — | — | — | 30 | — | — | — | — |
| SBR4-Gel 5 | — | — | — | — | 30 | — | — | — |
| SBR4-Gel 6 | — | — | — | — | — | 30 | — | — |
| SBR4-Gel 7 | — | — | — | — | — | — | 30 | — |
| SBR4-Gel 8 | — | — | — | — | — | — | — | 30 |
| Sulfur | 1.75 | 1.75 | 1.75 | 1.75 | 1.75 | 1.75 | 1.75 | 1.75 |
| Vulcanization accelerator | 1 | 1 | 1 | 1 | 1 | 1 | 1 | 1 |
| tanδ (0° C.) | 0.466 | 0.414 | 0.443 | 0.419 | 0.513 | 0.510 | 0.507 | 0.485 |
| tanδ (60° C.) | 0.296 | 0.234 | 0.235 | 0.233 | 0.285 | 0.246 | 0.241 | 0.241 |
| tanδ balance | 1.574 | 1.769 | 1.885 | 1.798 | 1.800 | 2.073 | 2.103 | 2.012 |
| Abrasion resistance (index) | 100 | 101 | 92 | 110 | 102 | 106 | 117 | 109 |

As explained above, the rubber composition containing the gelled rubber according to the present invention can provide a rubber composition having a high tan δ at 0° C. (i.e., good wet brake performance) and a low tan δ at 60° C. (i.e., good rolling resistance) which is suitable for applications such as tires as a rubber composition superior in viscoelasticity. Further, it can be used for conveyor belts, rubber hoses, fenders, rubber sheets etc.

What is claimed is:

1. A rubber composition comprising 50 to 90 parts by weight of a diene rubber and 50 to 10 parts by weight of a gelled rubber having a toluene swelling index of 16 to 150, based upon the total amount of 100 parts by weight of the diene rubber and the gelled rubber, wherein a glass transition temperature of the diene rubber is at least 10° C. lower than a glass transition temperature of the gelled rubber.

2. A rubber composition as claimed in claim 1, the gelled rubber contains at least 0.1% by weight of an acid anhydride moiety.

3. A process for producing a rubber composition comprising 100 parts by weight of a starting rubber containing 50 to 90 parts by weight of a diene rubber and 50 to 10 parts by weight of a gelled rubber, the glass transition temperature of the diene rubber being at least 10° C. less than the glass transition temperature of the gelled rubber, and 30 to 120 parts by weight of a filler, comprising the steps of mixing the diene rubber and at least 80% by weight of the total amount of the filler at a temperature of at least 135° C., and then mixing the gelled rubber and the remaining filler with the resultant mixture.

4. A process for producing a rubber composition as claimed in claim 3, wherein the toluene swelling index of the gelled rubber is 16 to 150.

* * * * *